(12) United States Patent
Adams et al.

(10) Patent No.: US 8,047,229 B2
(45) Date of Patent: Nov. 1, 2011

(54) FUEL CARTRIDGE WITH CONNECTING VALVE

(75) Inventors: Paul Adams, Monroe, CT (US); Andrew J. Curello, Hamden, CT (US); Floyd Fairbnks, Naugatuck, CT (US)

(73) Assignee: Societe Bic (FR)

( * ) Notice: Subject to any disclaimer, the term of this patent is extended or adjusted under 35 U.S.C. 154(b) by 170 days.

(21) Appl. No.: 12/431,352

(22) Filed: Apr. 28, 2009

(65) Prior Publication Data
US 2009/0205727 A1 Aug. 20, 2009

Related U.S. Application Data

(62) Division of application No. 10/629,006, filed on Jul. 29, 2003, now Pat. No. 7,537,024.

(51) Int. Cl.
*F16L 37/32* (2006.01)
(52) U.S. Cl. ............ 137/614.03; 137/614.04; 251/149.1
(58) Field of Classification Search .................. 137/614, 137/614.03–614.05; 251/149.1, 149.6
See application file for complete search history.

(56) References Cited

U.S. PATENT DOCUMENTS

| | | | | |
|---|---|---|---|---|
| 2,505,093 A | * | 4/1950 | Brock | 137/614.04 |
| 3,859,037 A | * | 1/1975 | Mohr | 431/344 |
| 4,334,551 A | * | 6/1982 | Pfister | 137/614.03 |
| 4,458,719 A | * | 7/1984 | Strybel | 137/614.03 |
| 5,911,403 A | * | 6/1999 | deCler et al. | 137/614.03 |
| 7,537,024 B2 | * | 5/2009 | Adams et al. | 137/614.04 |
| 7,628,171 B2 | * | 12/2009 | Watanabe | 137/614.03 |

* cited by examiner

*Primary Examiner* — Kevin Lee
(74) *Attorney, Agent, or Firm* — The H.T. Than Law Group

(57) ABSTRACT

A shut-off valve or connecting valve capable of connecting a fuel supply to a fuel cell is disclosed. The valve comprises a first valve component and a second valve component. Each valve component has an outer housing and a biased slidable member disposed inside the housing forming an internal seal. During the connection process, the two valve components establish an inter-component seal. Afterward, in one suitable embodiment the slidable member moves inward and opens the internal seal in the valve component to establish a flow path. In another embodiment, the slidable member moves inward and exposes a first filler and the first filler abuts a second filler in the other valve component to establish a flow path. In other embodiments, at least one valve component is sized and dimensioned to limit access to the internal seal.

31 Claims, 14 Drawing Sheets

FUEL CARTRIDGE WITH CONNECTING VALVE

CROSS-REFERENCE TO RELATED APPLICATION

The present application is a divisional application of U.S. application Ser. No. 10/629,006, filed on Jul. 29, 2003, now U.S. Pat. No. 7,537,024, which is incorporated herein by reference in its entirety.

FIELD OF THE INVENTION

This invention generally relates to fuel cartridges for fuel cells, and more particularly this invention relates to disposable and refillable fuel cartridges. This invention also relates to a valve connecting a fuel cartridge to a fuel cell or to a refilling device.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely fuel cells utilizing compressed hydrogen ($H_2$) as fuel, proton exchange membrane (PEM) fuel cells that use methanol ($CH_3OH$), sodium borohydride ($NaBH_4$), hydrocarbons (such as butane) or other fuels reformed into hydrogen fuel, and PEM fuel cells that use methanol ($CH_3OH$) fuel directly ("direct methanol fuel cells" or DMFC). Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Reaction at the Anode:

$$CH_3OH + H_2O \rightarrow CO_2 + 6H^+ + 6e^-$$

Reaction at the Cathode:

$$O_2 + 4H^+ + 4e^- \rightarrow 2H_2O$$

The Overall Fuel Cell Reaction:

$$CH_3OH + 1.5O_2 \rightarrow CO_2 + 2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants and laptop computers, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The cell reaction for a sodium borohydride reformer fuel cell is as follows:

$$NaBH_4(aqueous) + H_2O \rightarrow (\text{heat or catalyst}) \rightarrow (H_2) + (NaBO_2)(aqueous)$$

$$H_2 \rightarrow 2H^+ + 2e^- (\text{at the anode})$$

$$2(2H^+ + 2e^-) + O_2 \rightarrow 2H_2O (\text{at the cathode})$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in United States published patent application no. 2003/0082427, which is incorporated herein by reference.

One of the most important features for fuel cell application is fuel storage. Another important feature is to regulate the transport of fuel out of the fuel cartridge to the MEA. To be commercially useful, fuel cells such as DMFC systems should have the capability of storing sufficient fuel to satisfy the consumers' normal usage. For example, for mobile or cell phones, for notebook computers, and for personal digital assistants (PDAs), fuel cells need to power these devices for at least as long as the current batteries, and preferably much longer. Additionally, the fuel cells should have easily replaceable or refillable fuel tanks to minimize or obviate the need for lengthy recharges required by today's rechargeable batteries.

However, a need exists for a connecting valve that connects and disconnects the fuel cartridge to the fuel cell and the refilling fuel container.

SUMMARY OF THE INVENTION

Hence, the present invention is directed to a fuel supply adapted for use with a fuel cell.

The present invention is also directed to a fuel supply adapted for use with a direct methanol fuel cell.

The present invention is also directed to a fuel supply adapted for use with a reformat fuel cell.

The present invention is also directed to a fuel supply having a valve capable of connecting the fuel supply to a fuel cell. Fuel supply can be a fuel cartridge, a fuel container, or a fuel line, among other fuel supplies, and fuel cell includes an optional pump. The connecting valve can be used in the transport of fuel from the fuel supply to the fuel cell and it can also be used in the transport of byproducts from the fuel cell back to the fuel supply or a waste container. A fuel supply can have multiple connecting valves.

One aspect of the present invention is directed to a valve comprising two valve components capable of connecting a fuel supply to a fuel cell. Each valve component has a housing and a biased slidable inner body, which cooperates with a sealing member to form an internal seal in each valve component. During the connection the two valve components form an inter-component seal at least before the internal seals open to create a fluid flow path through the valve.

One valve component is connected to the fuel supply and the other valve component is connected to the fuel cell. The slidable inner body can be a sphere or a valve head with a body member or the like. The slidable inner body may have a pushrod, which makes contact with the opposing slidable inner body. The slidable body is biased by a spring member, which can be a helical spring, a wave spring, compressed foam, an elastomeric or rubber spring, or the like. The spring constants can be substantially the same in both valve components or they can be substantially different. In one example, the spring constant of the spring in the valve component connected to the fuel cell is lower than the spring constant of the spring in the valve component connected to the fuel supply, so that the internal seal in the valve component connected to the fuel cell opens first.

The sealing member can be an o-ring, a sealing face, a washer, an elastomeric ball or the like. The inter-component seal can be formed between any portions of the opposing valve components. For example, it can be formed between a portion of the housing of one valve component and the sealing member of the other valve component or between the housing of one valve component and the housing of the other valve component. The inter-component seal can be formed before any internal seal opens, or after the internal seal of the valve component connected to the fuel cell opens.

The fluid flow path can be established in the space between the housing and the slidable inner body, or in one or more channels defined on one or both of the slidable inner bodies. The valve may also have a liquid retention material surrounding the first and second valve components, or within one or both valve components where the liquid retention material is located in the downstream direction from the internal seal of the valve component. The valve may further have a retainer to keep the two valve components in the connected position.

One or both of the internal seals can be opened by a pump, or the pump when in the off position can provide the internal seal to the valve component. One or both of the valve components may have a second internal seal, which can be a closed washer or a duckbill valve. The duckbill valve can be sized and dimensioned to limit access to the internal seal. At least one of the valve components may have a nozzle or a sleeve sized and dimensioned to limit access to the internal seal.

Another aspect of the present invention is directed to another valve comprising two valve components capable of connecting a fuel supply to a fuel cell. The first valve component comprises an outer housing, a biased sleeve slidable relative to the outer housing, and a filler material contained within the biased sleeve. The second valve component comprises an outer housing, a sleeve and a filler material contained within the sleeve. During connection, the first sleeve and the second sleeve push each other so that the filler materials abut each other to form a fluid flow path through the valve. The sleeve in the second valve component can be fixed relative to the housing or be slidable relative to the housing.

With respect to this valve, during connection the two valve components form an inter-component seal between them, preferably before the fuel flow path is formed. The slidable sleeve is biased by a spring member, which can be a helical spring, a wave spring, compressed foam, an elastomeric or rubber spring, or the like. During connection the first sleeve is pushed back to expose at least a portion of the filler material. The filler material in the sleeve can be positioned behind the leading edge of the sleeve to form a cavity, and the exposed portion of the filler material in the first sleeve is sized and dimensioned to be received in this cavity.

This valve may further comprise a liquid retention material positioned spaced apart from the fluid flow path. The fuel retention material may be a liquid swellable material and may have additive(s) contained therein. The liquid retention material can be disposed in the annular area between the outer housing and the sleeve in the valve component. This valve can also have a nozzle or an outer collar, sized and dimensioned to limit access to the valve component.

In accordance with another aspect of the present invention, the valve also has a liquid retaining material, disposed in at least one valve component, capable of retaining fuel or other liquids remaining in the valve when one valve component disconnects from the other valve component. The liquid retention material is located in the downstream direction from the internal seal of the valve component.

In accordance with another aspect of the invention, the first valve component has a housing and an internal seal formed by a slidable inner body biased against a sealing member and the second valve component may have a duckbill valve. During connection, the housing enters the duckbill valve to open the internal seal of the duckbill valve, and form an inter-component seal at least before the internal seals open to create a fluid flow path through the valve. A pump can be used to open the internal seal in the first valve component. The duckbill valve comprises wipers that form at least one chamber with the outer surface of the housing of the first valve component, where pressurized fuel, if any, can expand in the chamber and bleeds off its pressure when the valve is disconnected. The duckbill valve may comprise a liquid retention material to absorb fuel or an additive capable of mixing with the fuel. The second valve component may also have a second internal seal.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE EMBODIMENTS

Figure 1A:
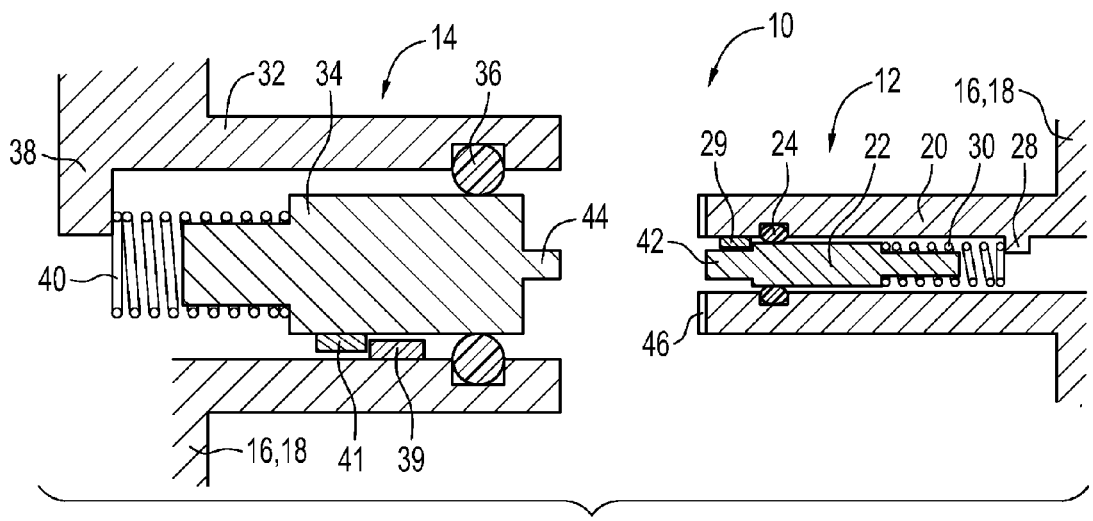
FIG. 1(a) is a cross-sectional view of two unconnected valve components of an embodiment of the present invention.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell, reformat fuel cell, among others. The fuel supply may contain other types of fuel cell fuels, such as ethanol or alcohols, chemicals that can be reformatted into hydrogen, or other chemicals that may improve the performance or efficiency of fuel cells. Fuels also include aqueous potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH fuel is disclosed in United States published patent application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water, discussed above. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions, or liquids contained in the fuel supply. The term "fuel" as used herein includes all fuels that can be reacted in any fuel cells, and includes, but is not limited to, all of the above suitable fuels, electrolytic solutions, oxidant solutions, liquids, and/or chemicals and mixtures thereof.

Also, as used herein "fuel supply" includes fuel cartridges, fuel containers and fuel lines, among other fuel supplies. The exemplary embodiments of the present invention are described herein being connectable to a fuel cartridge. It is understood, however, that the present invention is suitable for use with any fuel supply, as defined above. Furthermore, as used herein "fuel cell" includes an optional pump, which may reside within the electrical component that the fuel cell powers. The pump is also attachable to the fuel supply.

Furthermore, the shut-off valves or connecting valves discussed herein are suitable for communicating fuel from a fuel supply to a fuel cell and for communicating liquid and/or gas byproducts produced in the fuel cell back to the fuel supply or to a waste container. While the present invention is described in detail below with respect to communicating fuel from the fuel supply to the fuel cell, it is understood that the valves of the present invention are suitable for transporting fluids, i.e., liquid or gas, to and from the fuel supply, and/or to and from the fuel cell.

In accordance with an embodiment of the present invention, shut-off valve or connecting valve 10 comprises at least first valve component 12 and second valve component 14, as shown in FIG. 1(a). First valve component 12 or second valve component 14 can be mated either to fuel cartridge 16 or to fuel cell 18. Fuel cell cartridges and fuel cells are disclosed in commonly owned, co-pending patent application Ser. No. 10/356,793, entitled, "Fuel Cartridge for Fuel Cells," filed on Jan. 31, 2003. The '793 patent application is incorporated herein by reference in its entirety.

Figure 1B:
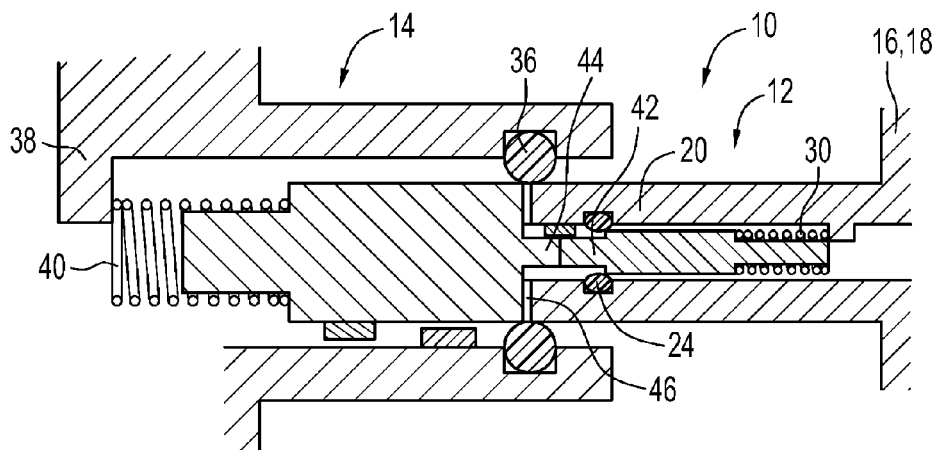
FIG. 1(b) is a cross-sectional view of the two valve components of FIG. 1(a) in contact with each other.
Figure 1C:
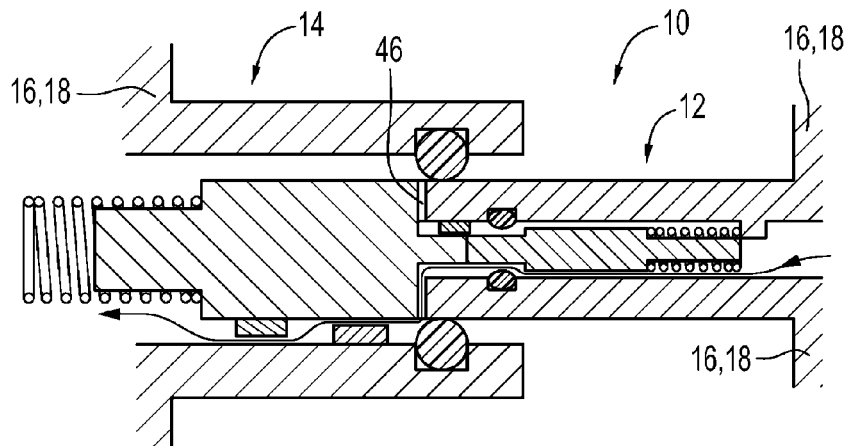
FIG. 1(c) is a cross-sectional view of the two valve components of FIGS. 1(a) and 1(b) connected to each other to allow fuel to flow from a cartridge to a fuel cell.

In this configuration, first valve component 12 comprises similar elements as second valve component 14. First valve component 12 comprises housing 20, which encases sliding body 22 and o-ring 24. Sliding body 22 forms an internal seal with o-ring 24 to prevent fuel from being transported through first valve component 12 when the valve component is not connected. Spring 30 pressed against stop 28 biases body 22, and body 22 is movable against spring 30. Housing 20 may also have retainer 29 to retain body 22 within the housing. Similarly, second valve component 14 comprises housing 32, sliding body 34 and o-ring 36. Spring 40 presses against stop 38 and biases sliding body 34. Sliding body 34 forms an internal seal with o-ring 36 to prevent fuel from being transported through the valve component when unconnected. Sliding body 34 is movable against spring 40. Housing 32 and sliding body 34 may also have retaining members 39 and 41, respectively, to retain sliding body 34 within the housing. Also, as shown in FIGS. 1(a)-1(c), o-rings 24 and 36 are shown to reside in grooves defined on housing 20 and 32, respectively. Alternatively, these o-rings can reside in grooves defined on sliding bodies 22 and 34.

To connect the fuel cartridge to the fuel cell and to transport fuel from the fuel cartridge to the fuel cell, first member 12 is inserted into second member 14, as shown in FIGS. 1(b) and 1(c). Pushrod 42 on sliding body 22 contacts and acts on pushrod 44 on sliding body 34, as the two valve components are brought into contact with each other. As pushrods 42 and 44 push each other, springs 30 and 40 are partially compressed by sliding bodies 22 and 34. Springs 30 and 40 may have the same resistance or spring constant, so that the internal seals in the valve components are opened at the same time. Alternatively, springs 30 and 40 can have different spring constants so that one internal seal is selectively opened before the other one. As shown in FIG. 1(b), spring 30 has a lower spring constant so that the seal in first valve component 12 selectively opens first. Preferably, before the internal seal in first valve component 12 opens, body 20 of first valve component 12 forms an inter-component seal with o-ring 36 of second valve component 14. As first and second valve components 12 and 14 are being pushed farther toward each other, body 22 comes into contact with stop 28 and stops, as shown in FIG. 1(c), or spring 30 is fully compressed and body 22 stops, thereby causing body 34 of second valve component 14 to move away from o-ring 36. Channels 46, defined on the leading edge of housing 20, move behind o-ring 36 and open up a flow channel from the fuel cartridge to the fuel cell, as shown by the flow line in FIG. 1(c). Depending on the spring constant of spring 30, channels 46 may move behind o-ring 36 without having body 22 come to a stop. The flow line would be in the opposite direction, if second valve component 14 were mated to the fuel cartridge. A lead-in chamfer can be provided on housing 32 to protect o-ring 36 from potential damage caused by the insertion of valve component 12 into valve component 14.

Alternatively, spring 40 may have a lower spring constant so that the seal in second valve component 14 opens before the seal in first valve component 12 opens. In accordance to one aspect of the present invention, the spring positioned within the electronic device or fuel cell is the weaker spring, so that the valve component connected to the electronic device or fuel cell is selectively opened first.

Figure 2A:
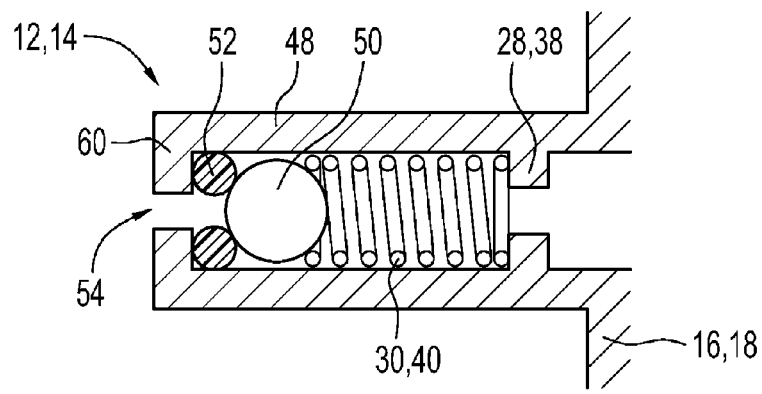
FIG. 2(a) is a cross-sectional view of an alternative valve component of FIGS. 1(a)-(c)
Figure 2B:
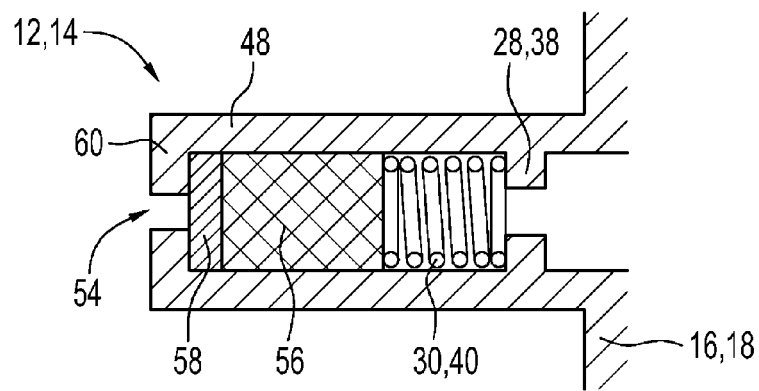
FIGS. 2(b) and 2(c) are cross-sectional views of other alternative valve components.
Figure 2C:
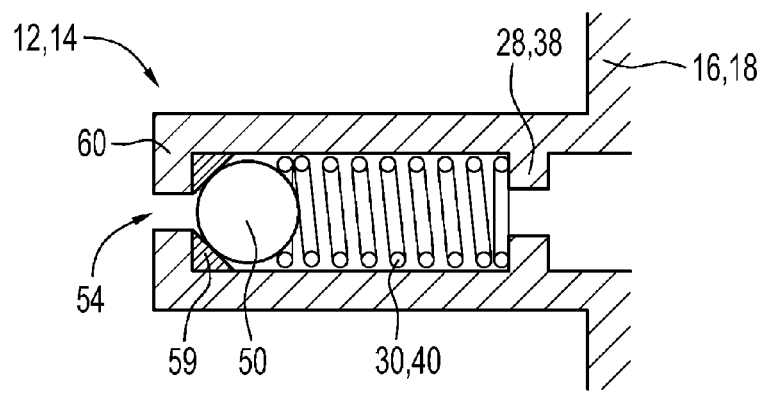

First and second valve components 12 and 14 may have other interchangeable configurations, such as those shown in FIGS. 2(a), 2(b) and 2(c). The valve component shown in FIG. 2(a) comprises a housing 48 encasing ball 50, which is adapted to slide within housing 48 and o-ring 52. Ball 50 is biased against o-ring 52 by spring 30 or 40. An internal seal is formed between ball 50 and o-ring 52, and housing 48 defines aperture 54, which is sized and dimensioned to receive pushrod 42 or 44. Pushrod 42 or 44 contacts and pushes ball 50 rearward to open the internal seal. The valve component shown in FIG. 2(b) comprises housing 48 encasing sliding body 56, which has sealing face 58 adapted to form an internal seal with lip 60 of housing 48. The valve component shown in FIG. 2(c) is similar to that in FIG. 2(a), except that o-ring 52 is interchanged with sealing member 59. Sealing member 59 is preferably an o-ring having a triangular cross-section with three surfaces. Two of the surfaces are pressed flush against lip 60 and the third surface forms a seal with ball 50, as shown. Ball 50 is preferably made from an elastomeric rubber, metal or metal coated with an elastomeric rubber. The sealing members and the o-rings can be made from the same material, such as elastomeric rubbers including Buna N Nitrile, other nitrile rubbers, ethylene propylene diene methylene terpolymer (EPDM) rubber or Vitron® fluoro-elastomer, depending on the fuel stored in the fuel supply.

To open the seal, pushrod 42 or 44 enters aperture 54 and pushes body 56 or ball 50 backward against the biasing force of spring 30 or 40. The operation or sequence of establishing a flow path within valve components 12 or 14 shown in FIGS. 2(a), 2(b) and 2(c) is similar to the operation discussed in connection with FIGS. 1(a)-1(c) above, i.e., an inter-component seal between the two valve components is established before the internal seals open.

Figure 3A:
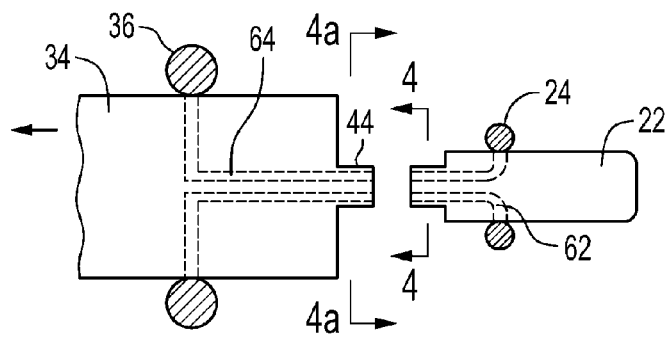
FIGS. 3(a) and (b) are schematics of the valve components of FIGS. 1(a)-(c) showing alternative flow paths with certain details omitted for clarity.
Figure 3B:
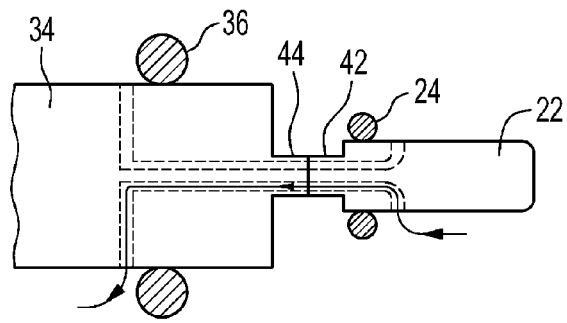
FIG. 3(c) shows an alternative valve component of FIG. 3(a) and FIG. 3(d) shows an alternative flow path through the valve components.

FIGS. 3(a) and 3(b) show an alternative fuel flow path from the fuel cartridge to the fuel cell. Sliding body 22 defines one or more channels 62 and sliding body 34 defines one or more channels 64. When the two valve components are unconnected, the proximal ends of channels 62 and 64 terminate at or before o-rings 24 and 36, respectively. The distal ends of these channels terminate at pushrods 42 and 44, respectively, and the distal ends are positioned directly opposite to each other. When the pushrods contact each other, channels 62 and 64 are in fluid communication with each other. However, fuel flow can only be initiated after the proximal ends of channels 62 and 64 are pushed past the o-rings. The flow line in FIG. 3(b) illustrates the fuel flow path. Again, the fuel flow line can be reversed depending on which valve component is mated to the fuel cartridge.

Figure 3C:
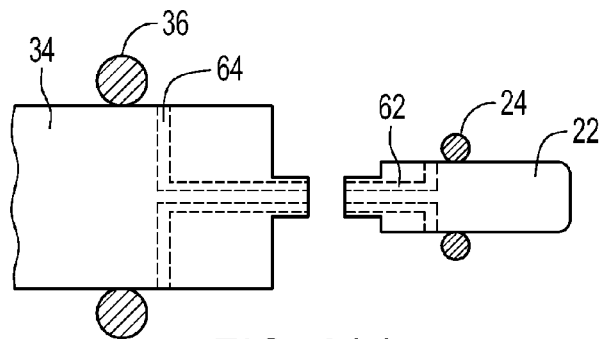
Figure 3D:
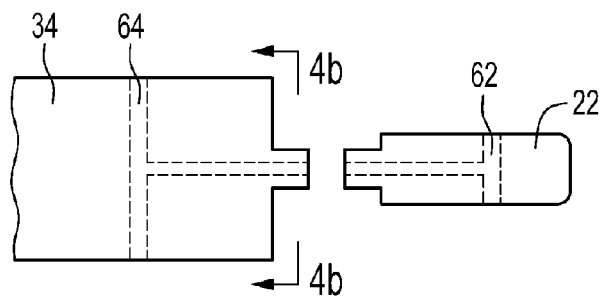

FIG. 3(c) illustrates an alternative flow path, wherein channels 62 and 64 are positioned in front of the o-rings before the two valve components are connected. After the valve components are connected, the fuel flow path is the same as that depicted in FIG. 3(b). FIG. 3(d) illustrates that channels 62 and 64 may have a channel in the longitudinal direction and a channel in the transverse direction. These channels can be readily machined into the sliding bodies during the manufacturing process, or can be molded or die cast.

Figure 4A:
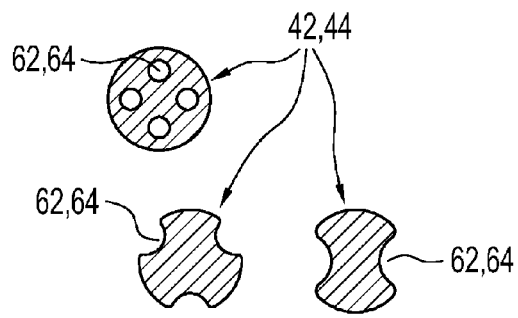
FIG. 4(a) shows cross-sectional views along lines 4a-4a in FIG. 3(a) and FIG. 4(b) shows cross-sectional views along line 4b-4b in FIG. 3(d)
Figure 4B:
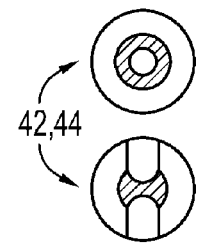
Figure 5:
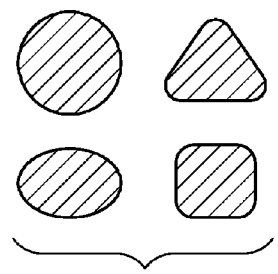
FIG. 5 shows cross-sectional views of suitable O-rings.

FIGS. 4(a) and 4(b) illustrate the shapes and locations that channels 62 and 64 may have. These channels can be located on the surface of pushrods 42 and 44 or inside of the pushrods. Any number of channels can be located in the pushrods or in the sliding bodies. FIG. 5 depicts the possible cross-sections of the o-rings described herein to include triangular, square, circular, oval or polygonal shape.

Figure 6:
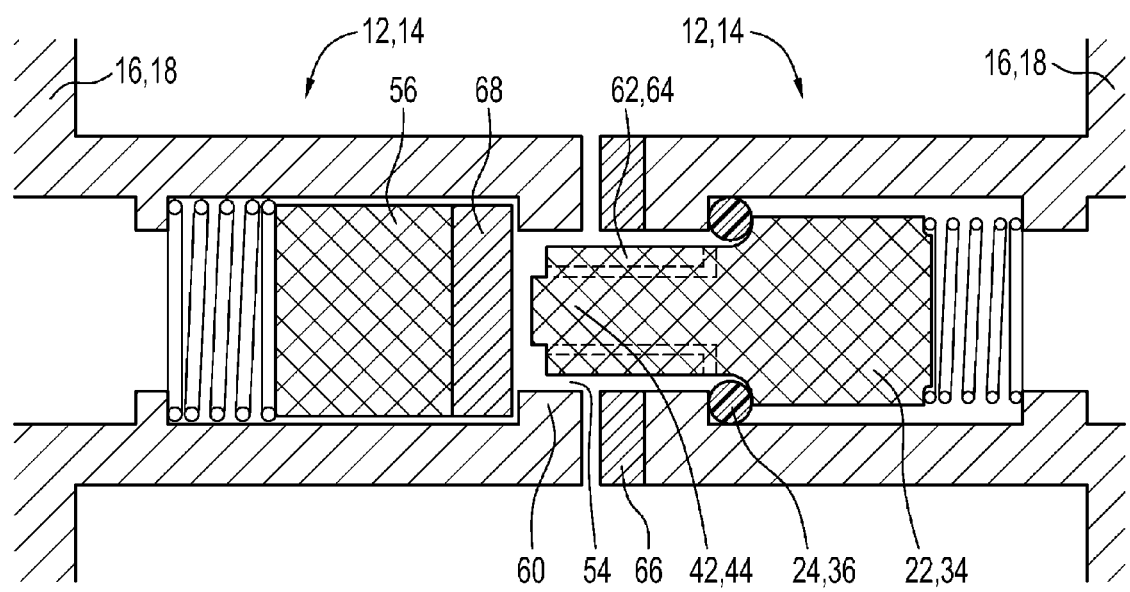
FIG. 6 is a cross-sectional view of another valve embodiment of the present invention.

FIG. 6 shows that any embodiment of valve component 12 or 14 shown herein is usable with any other embodiment. As shown, the valve component illustrated in FIG. 2(b) is used opposite to the valve component illustrated in FIG. 3(c). Pushrod 42 or 44 is sized and dimensioned to be received in aperture 54. Before the internal seals inside the valve components, i.e., between sliding body 22 or 34 and o-ring 24 or 36 or between sealing face 58 and lip 60, are opened, second sealing face 66 of one valve component establishes an inter-component seal with the outer surface of lip 60 of the other valve component. As pushrod 42 or 44 contacts and pushes sealing member 58 rearward, it opens the internal seals within the valve components to open the fuel flow path.

Figure 7A:
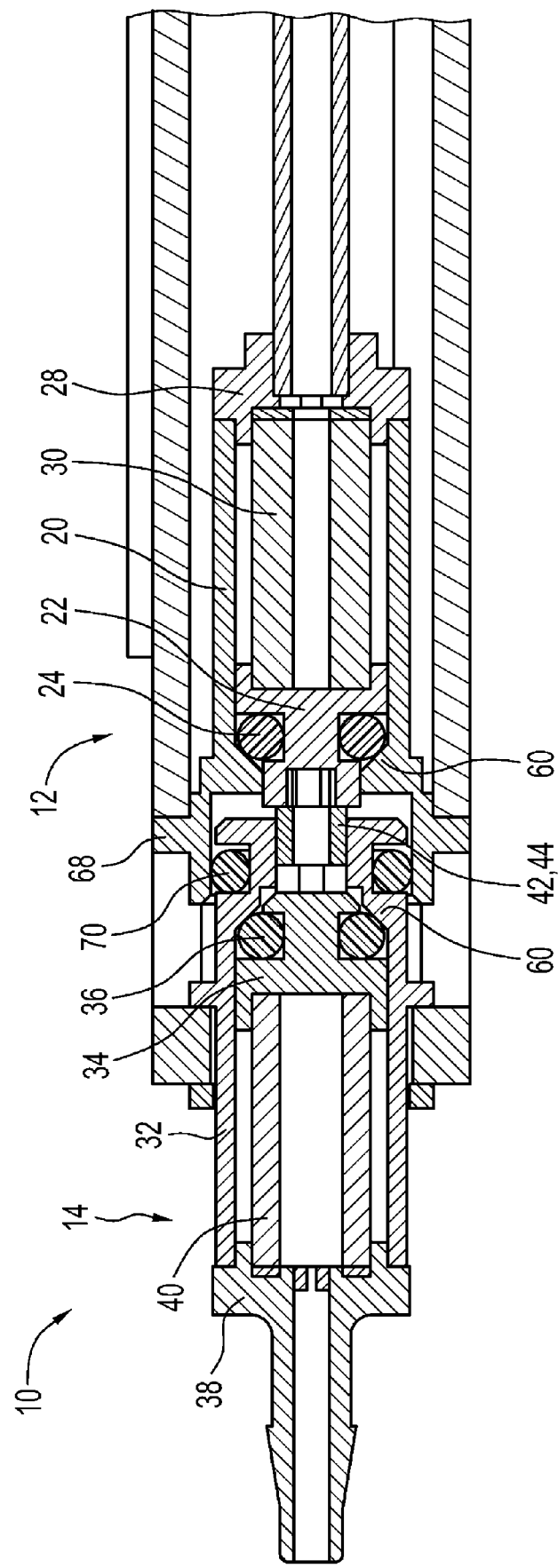
FIG. 7(a) is a cross-sectional view of two valve components of another embodiment of the present invention with an inter-component seal established between the two valve components.
Figure 7B:
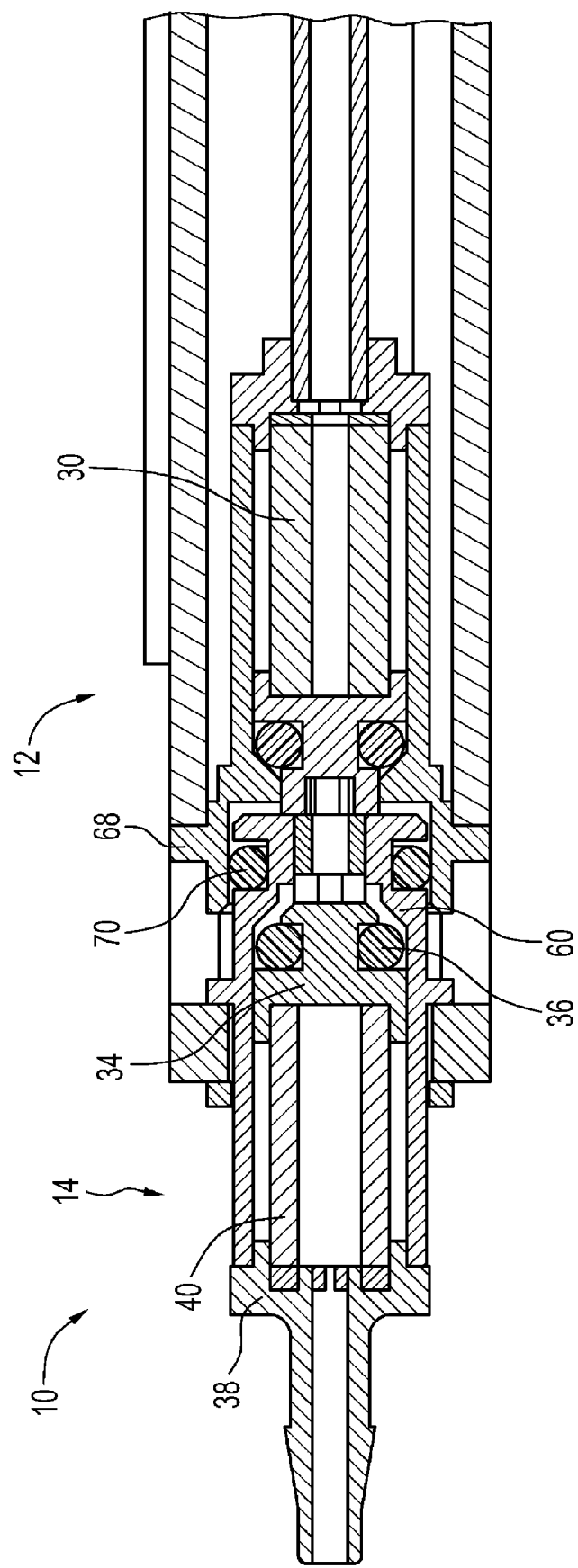
FIG. 7(b) is a cross-sectional view of the two valve components of FIG. 7(a) with the internal seal in one of the valve components opens.
Figure 7C:
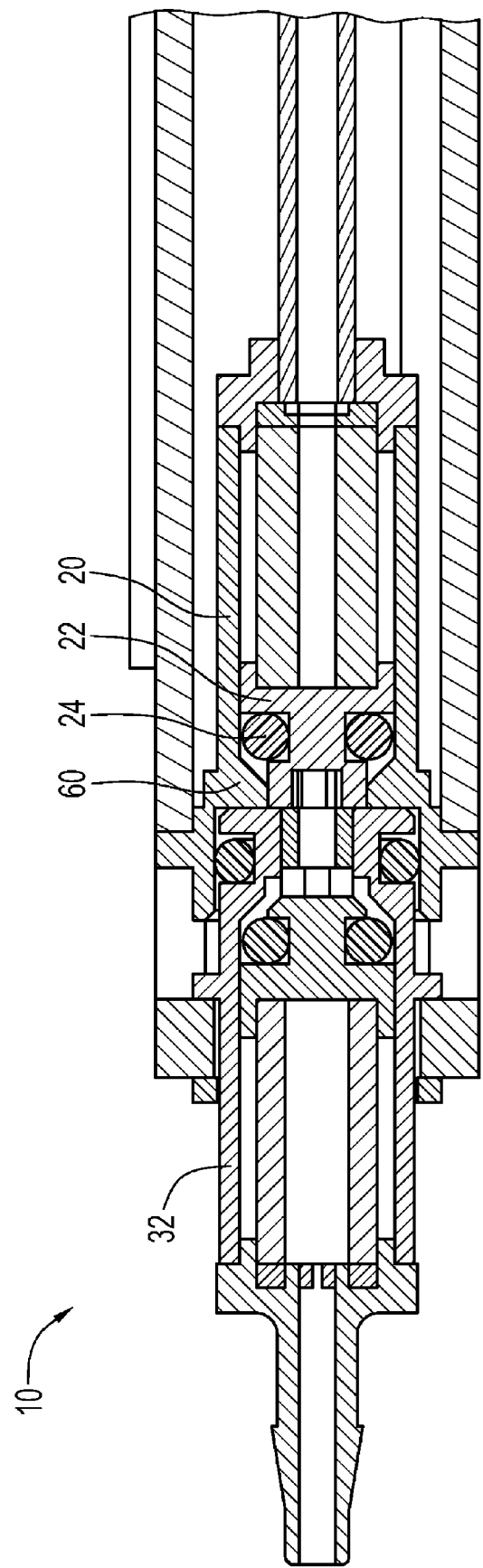
FIG. 7(c) is a cross-sectional view of the two valve components of FIGS. 7(a) and 7(b) with both internal seals open.

FIGS. 7(a)-7(c) show another embodiment of the present invention, showing in more detail a particular sequence of the inter-component seal being established and the internal seals being sequentially opened. In FIG. 7(a), valve component 12 has sliding body 22 biased by spring 30, which in this embodiment is an elastomeric spring and is discussed further below. O-ring 24 is fixedly disposed on sliding body 22 and forms an internal seal with a slanted inner surface on lip 60 of housing 20. In this embodiment, housing 20 further has sleeve 68 formed on the front of valve component 12. Valve component 14 is similarly constructed to valve component 12, as discussed above, except that it has a second o-ring 70 fixedly disposed on the outer surface of housing 32. O-ring 70 and the inner surface of sleeve 68 form the inter-component seal between the valve components, as shown in FIG. 7(a). As used herein, the term "rubber" includes both rubber and elastomeric material and "elastomeric" includes both elastomeric material and rubber.

In FIG. 7(b), the two valve components are pushed farther toward each other. Since spring 40 has a lower spring constant than spring 30, as depicted by the relative thickness of the rubber springs, spring 40 is compressed first and sliding body 34 is pushed backward, thereby opening the internal seal in valve component 14 between o-ring 36 and lip 60. In FIG. 7(c), the two valve components are pushed farther toward each other until housings 20 and 32 contact each other. At this junction, the internal seal in valve component 12 between o-ring 24 and lip 60 is opened to create a fuel flow path through valve 10.

Figure 8A:
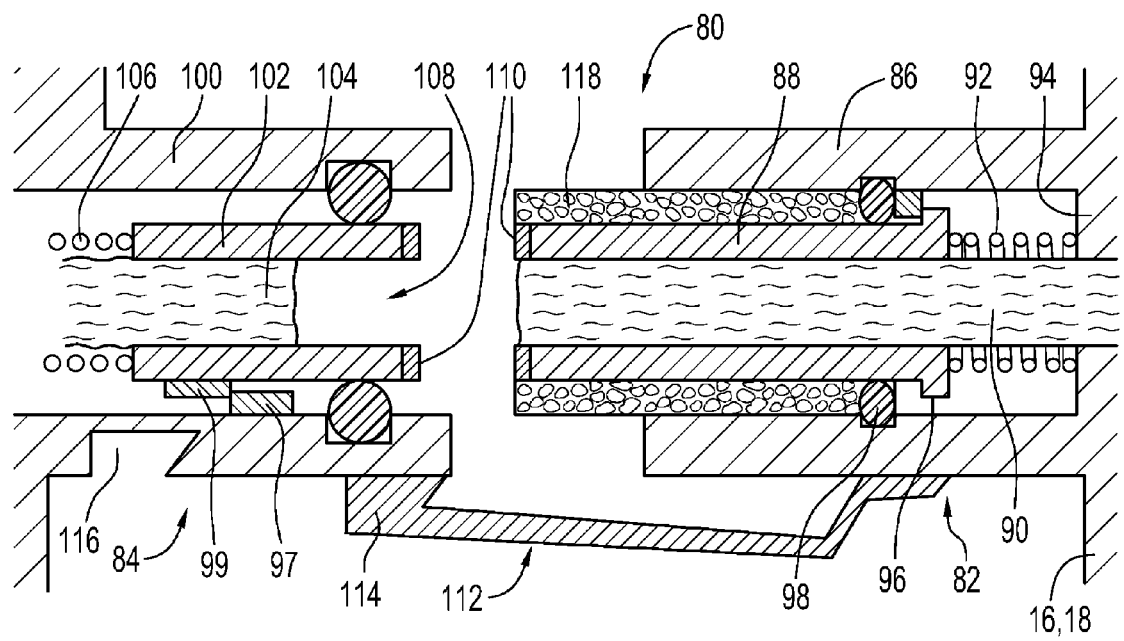
FIG. 8(a) is a cross-sectional view of two unconnected components of another embodiment of the present invention.
Figure 8B:
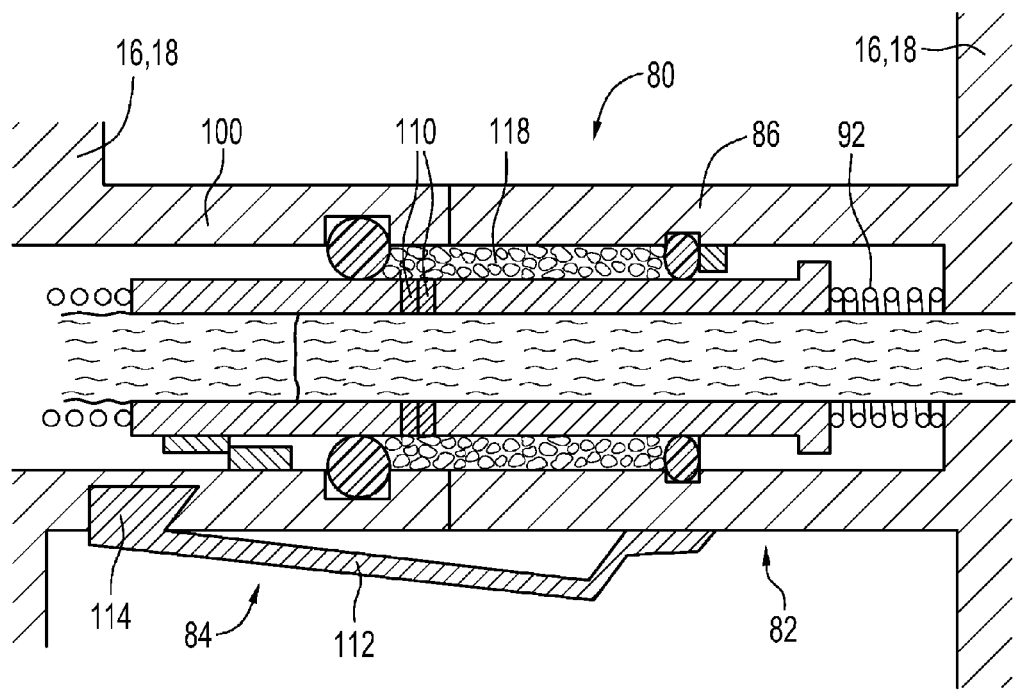
FIG. 8(b) is a cross-sectional view of the two components of FIG. 8(a) connected to each other to allow fuel to flow from the cartridge to the fuel cell.

FIGS. 8(a) and 8(b) show another embodiment of the present invention where fuel permeable filler is used to establish a flow path in connecting valve 80. Preferably, the fuel permeable filler is capable of transporting by capillary action fuel from inside the fuel cartridge, through connecting valve 80 and to the fuel cell. Such fuel permeable filler is disclosed in the commonly owned, co-pending '793 patent application, which has already been incorporated herein by reference in its entirety.

Figure 8C:
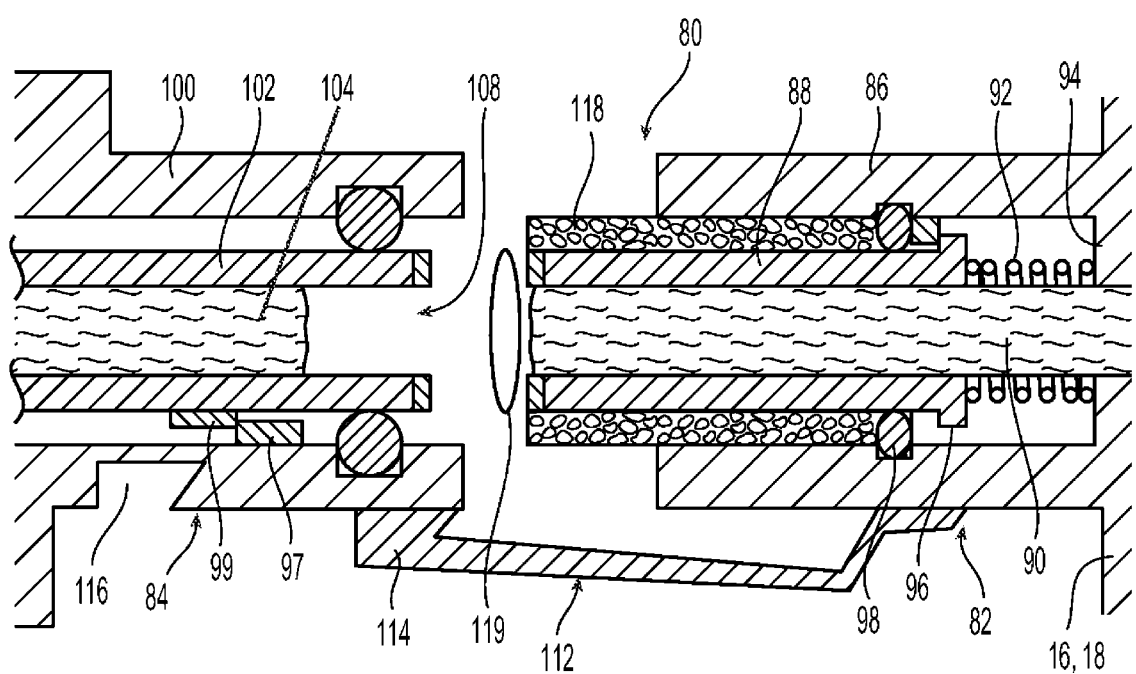
FIG. 8(c) is a cross-sectional view similar to FIG. 8(a) showing another embodiment.

Connecting valve 80 comprises first valve component 82 and second valve component 84. First valve component 82 or second valve component 84 can be mated to cartridge 16 or to fuel cell 18. In this configuration, first valve component 82 comprises outer housing 86, sleeve 88 and filler material 90. Sleeve 88 is slidable in the longitudinal direction relative to outer housing 86 and to filler material 90, and is biased by spring 92 against stop 94. Sleeve 88 may also have optional upstanding retaining wall 96, which cooperates with o-ring 98 disposed in the annular space between outer housing 86 and sleeve 88, to retain sleeve 88 within first valve component 82. Preferably, sleeve 88 or 102 can be retained in the valve component by cooperating stops, such as stops 97 and 99. O-ring 98 also provides a seal in this annular space. Second valve component 84 comprises outer housing 100, sleeve 102 and filler material 104. Sleeve 102 may be slidable with respect to outer housing 100 and filler material 104, and is biased by spring 106, as shown in FIG. 8(a). However, sleeve 102 may be stationary or fixed so that it is not movable relative to outer housing 102 and filler material 104, as illustrated in FIG. 8(c). Preferably, the leading edge of filler material 104 is spaced behind the leading edge of sleeve 102, as shown in FIG. 8(a). This creates a cavity 108, which is adapted to receive a portion of filler material 90 from first valve component 82.

When the two valve components 82 and 84 approach each other for connection, sleeves 88 and 102 contact each other first. Their leading sealing faces 110 can form an inter-component seal. In a preferred embodiment, sleeve 102 is non-slidable and, therefore, sleeve 88 is pushed backward against spring 92. As sleeve 88 retreats, a portion of filler material 90 is exposed and received by cavity 108. When filler materials 90 and 104 contact and abut each other, a flow path through the filler materials is established to transport fuel from the cartridge to the fuel cell, as shown in FIG. 8(b). Optionally, outer housings 86 and 100 also possess leading sealing faces to form a second inter-component seal.

Additionally, valve components 82 and 84 remain connected to each other by at least one snap-on retainer such as the one shown in FIGS. 8(a) and 8(b). The snap-on retainer comprises a spring-loaded arm 112, which is connected to one of the valve components and has head 114 at its distal end. Head 114 is sized and dimensioned to be received in corresponding cavity 116 located on the outer surface of the other valve component. When head 114 snaps into cavity 116, the two valve components are retained in the connected position. Valve 80 may have a plurality of such snap-on retainers. Furthermore, this snap-on retainer is also usable with connecting valve 10 described above with respect to FIGS. 1-7. Arm 112 can be spring-loaded with a separate spring, or arm 112 can be manufactured from metal or plastic and is spring loaded by live joint action. Valve 80 is disconnected by raising arm(s) 112 and withdrawing first valve component 82 from second valve component 84.

The annular space between outer housing 86 and sleeve 88, as well as the annular space between outer housing 100 and sleeve 102, can be filled with an absorbent or retention material 118, which can be the same material as filler material 90 or 104. Absorbent material 118 can absorb and retain fuel that remains in valve 80 when fuel cartridge 16 is disconnected from fuel cell 18. Alternatively, the absorbent material can be placed anywhere that is spaced apart from the fuel flow path. Other suitable absorbent materials include, but are not limited to, hydrophilic fibers, such as those used in infant diapers and swellable gels, such as those used in sanitary napkins or a combination thereof. Additionally, the absorbent materials can contain additive(s) that mixes with the fuel. Absorbent material 118 can also be used in conjunction with valve 10 described above in connection with FIGS. 1-7. For example, housing 20, 32 or 48 is disposed concentrically within an outer housing and the annular space between housing 20, 32 or 48 and this outer housing is filled with absorbent material 118.

For shipping and storage, a fuel cartridge with valve component 82 or 84 can be covered at the opening of the valve component with a cap or a film 119, which is removed, as shown in FIG. 8(c), before the cartridge is connected to the fuel cell.

Figure 9A:
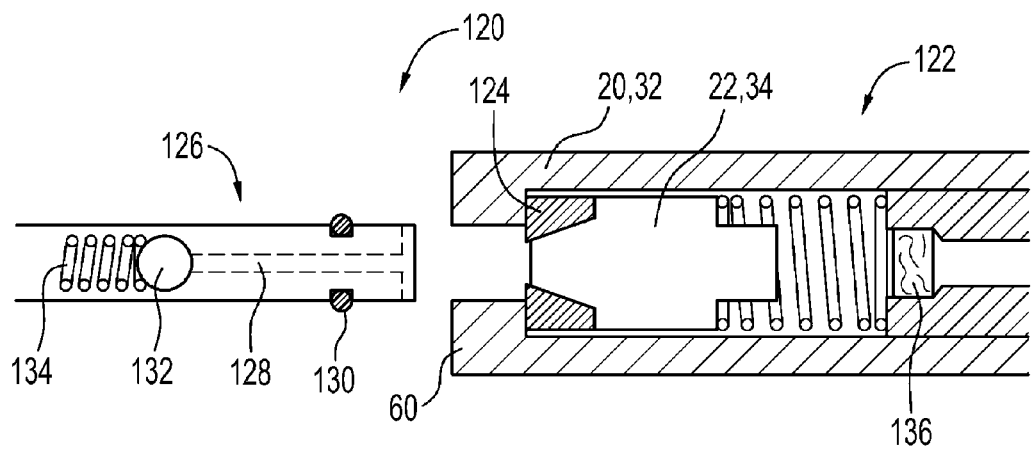
FIG. 9(a) is a cross-sectional view of two unconnected components of another embodiment of the present invention.
Figure 9B:
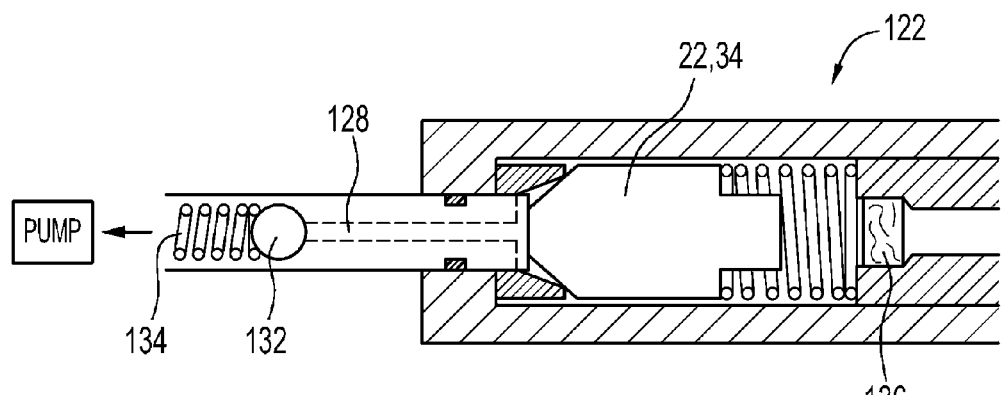
FIG. 9(b) is a cross-sectional view of the two components of FIG. 9(a) connected together.

FIGS. 9(a) and 9(b) show yet another embodiment of the present invention. Valve 120 comprises first valve component 122, which is similar to valve component 12 or 14 described above. Valve component 122 has housing 20, 32 and sliding body 22, 34, which is biased against sealing member 124 by spring 30, 40. Sealing member 124 is pushed by biased sliding body 22, 34 toward lip 60. Lip 60 is sized and dimensioned to receive pushrod 126. Pushrod 126 defines a channel 128 to communicate fuel through the pushrod. Pushrod 126 is the second valve component in this embodiment, and the housing of pushrod 126 is used to open the internal seal of the first valve component. Channel 128 can be internal to pushrod 126 as shown. Pushrod 126 may optionally have sealing o-ring 130 adapted to form an inter-component seal with a surface on lip 60. As shown in FIG. 9(b), before the internal seal of valve component 122 is opened, pushrod 126 forms an inter-component seal with sealing member 124. Hence, in this embodiment two inter-component seals, between lip 60 and o-ring 130 and between pushrod 126 and sealing member 124, can be formed between the two valve components.

Figure 10:
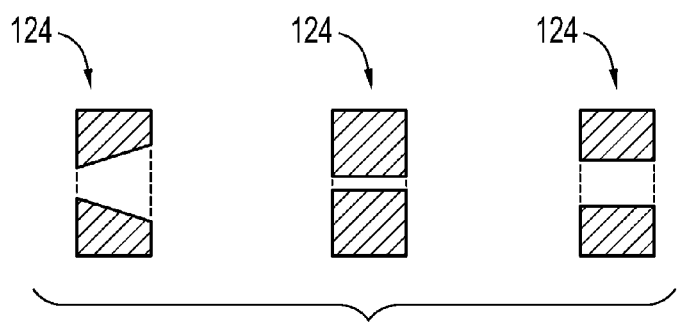
FIG. 10 shows cross-sectional views of suitable seals in FIGS. 9(a) and 9(b)

FIG. 10 shows suitable cross-sections for sealing member 124. The internal diameter of the sealing member does not need to be constant, so that pushrod 126 does not need to completely penetrate sealing member 124 before a flow path is established, as shown in FIG. 9(b). Sealing member 124 can also be an o-ring as shown in FIG. 5.

In accordance with an aspect of this embodiment, pushrod 126 can be hollow and can have a poppet valve, in the form of biased ball 132, disposed therein. Ball 132 is biased against an inside sealing surface in the pushrod. Hence, even after the inter-component seal is established and the internal seal in valve component 122 is opened, no fuel can flow until biased ball 132 is moved against spring 134 to open flow channel 128. A pump, such as the pumps discussed below, is activated to pull ball 132 to open the flow path. Spring 134 is sized so that the seal can be maintained, yet the pump can readily pull ball 132. Alternatively, the poppet valve inside pushrod 126 can be omitted. The pump can regulate the flow of fuel through the pushrod and can also stop the flow.

When pushrod 126 is disconnected from valve component 122 and the pump is turned-off, ball 132 returns to its sealing position. This seal maintains residual fuel in channel 128 and minimizes the chance of fuel flowing back out of the pushrod, because the seal forms a partial vacuum to keep fuel from flowing even if the pushrod is aligned in the vertical downward position. This effect is similar to the effect of pinching one end of a straw to prevent liquid from dripping out of the straw. Additionally, valve component 122 may have filler material 136 located behind the internal seal, as shown in FIGS. 9(a), 9(b), 11(a) and 11(b). Alternatively, filler material can be located in front of the internal seal, e.g., within channel 128 in the same figures. The filler material absorbs fuel and minimizes fuel flow when the valve component is unintentionally opened. Filler material 136 is usable in all the valve components disclosed herein, except for the embodiment shown in FIGS. 8(a) and 8(b). In a preferred embodiment, valve component 122 is mated to the cartridge and pushrod 126 is mated to the fuel cell.

Figure 11A:
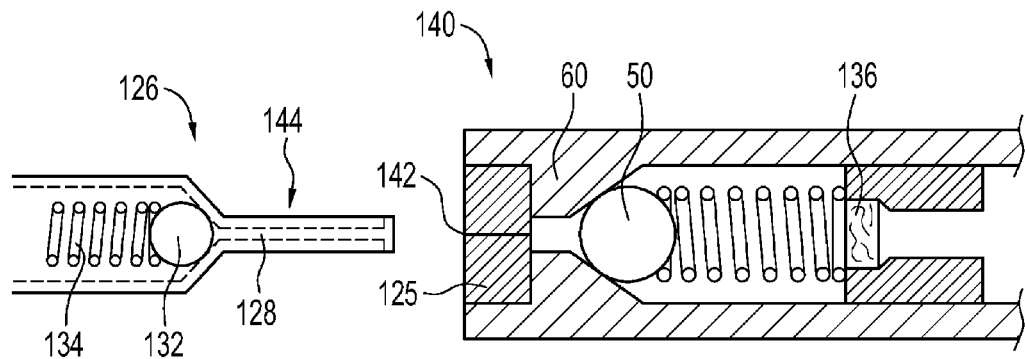
FIG. 11(a) is a cross-sectional view of two unconnected components of another embodiment of the present invention.
Figure 11B:
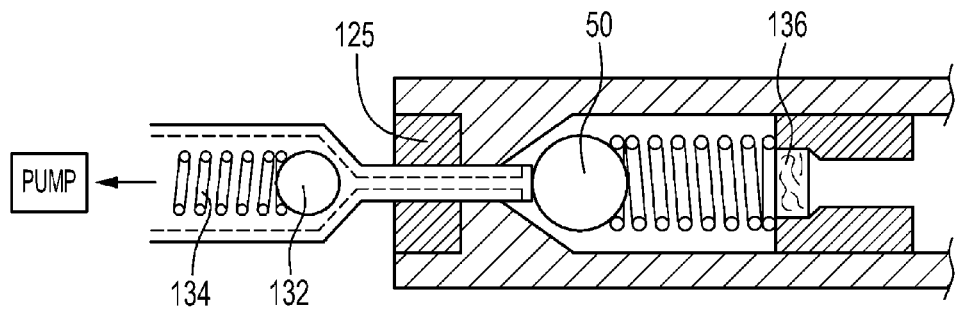
FIG. 11(b) is a cross-sectional view of the two components of FIG. 11(a) connected together.

Sealing member 124 can also be positioned spaced apart from sliding body 22, 34, as illustrated in FIGS. 11(a) and 11(b). In this embodiment, sliding body is interchangeably replaced with ball 50, which is biased against lip 60 to form an internal seal. Sealing member 124 is located on the other side of lip 60, and in this embodiment the sealing member is washer 125 having closed slit 142. Washer 125 forms an optional second internal seal and typically does not allow fuel or other liquid to pass through. Pushrod 126, in this embodiment, has needle nose 144 defining channel 128 therein. An inter-component seal is formed between needle nose 144 and washer 125 as the needle nose is inserted through valve component 140, and channel 128 is in fluid communication with valve component 140 after ball 50 is pushed backward. Fuel can flow through valve component 140 and pushrod 126 when a pump pulls ball 132 against spring 134 to open the internal seal inside pushrod 126.

Figure 11C:
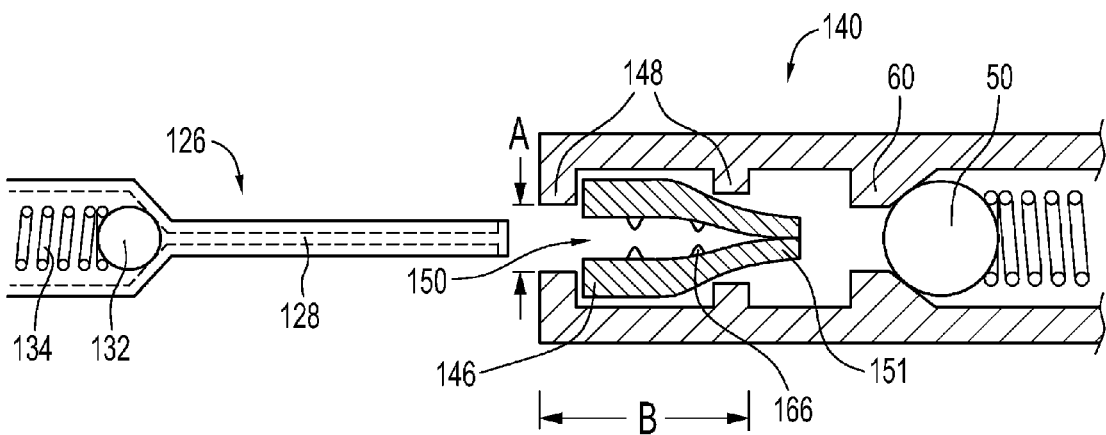
FIG. 11(c) is an alternative embodiment of FIG. 11(a)

Sealing member 124 can also be duckbill valve 146 illustrated in FIG. 11(c), which is interchangeable with washer 125. Duckbill valve is positioned between two retainers/lips 148 and has narrowing channel 150, which has an opening adapted to receive pushrod 126. Channel 150 narrows at sealed end 151, which provides an additional internal seal for valve component 140. An advantage of duckbill valve 146 is that sealed end 151 is spaced at a distance "B" from the opening "A," and opening "A" could also be made small, so that it is more difficult for a foreign object, such as a finger of the pulp of the finger, to open the seal unintentionally. Duckbill valve 146 can be used alone or in combination with any of the internal seals discussed herein. Preferably, opening "A" is less than about 10 mm and more preferably less than about 5 mm. Preferably, distance "B" is at least about 2 mm and more preferably at least about 5 mm.

Figure 12A:
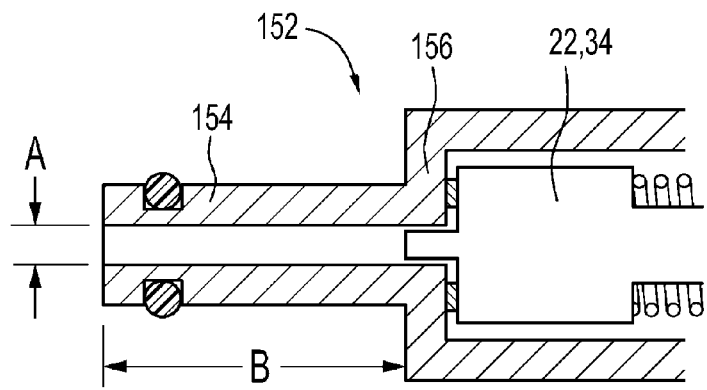
FIG. 12(a) is a cross-sectional view of another valve component in accordance to the present invention.
Figure 12B:
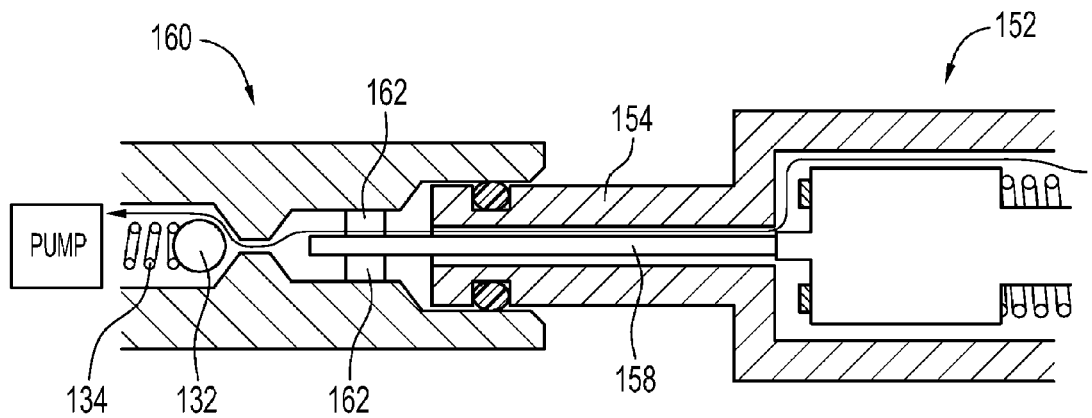
FIG. 12(b) is a cross-sectional view of the valve component of FIG. 12(a) being connected to a corresponding valve component.
Figure 12C:
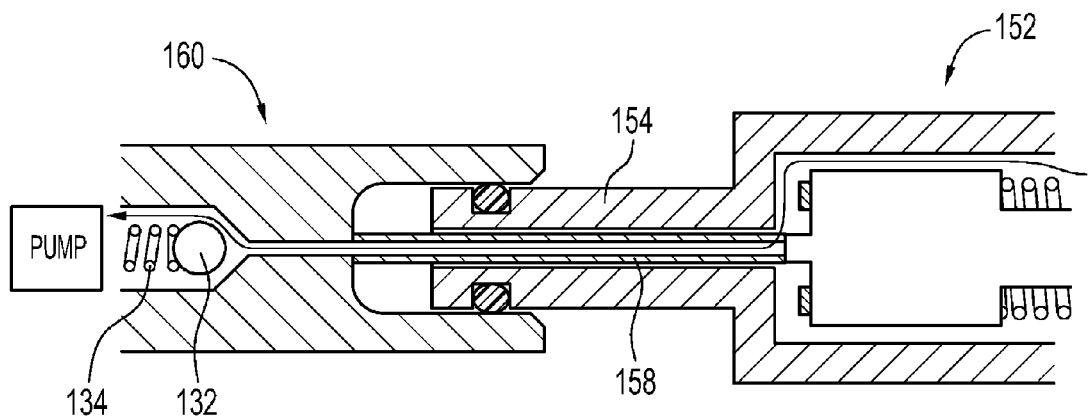
FIG. 12(c) is alternative embodiment of FIG. 12 (b)

Any of the valve components described herein may also have a leading member, such as a long nozzle, to limit access to its internal seal as shown in FIGS. 12(a)-12(c). Valve component 152 has nozzle 154, which limits access to an internal seal formed between sliding body 22, 34 and shoulder 156. Preferably, an o-ring or a sealing member is disposed between the sliding body and the shoulder, as shown. Nozzle 154 has opening "A" and length "B," which limit access to the internal seal. Nozzle 154 is sized and dimensioned to receive pushrod 158, which is adapted to push sliding body 22, 34 to open the internal seal in valve component 152. Pushrod 158 is mounted on valve component 160, which has an optional internal seal provided by biased ball 132, as discussed above. Pushrod 158 may have a diameter smaller than the inner diameter of nozzle 154, so that fuel can flow in the annular space between the nozzle and the pushrod, as shown in FIG. 12(b). In this embodiment, pushrod 158 is supported by a plurality of webs 162. Webs 162 define spaces between them, so that fuel can flow pass the webs. Alternatively, pushrod 158 may be hollow and have an outer diameter that is substantially the same as the inner diameter of nozzle 154, and fuel is selectively flowed through the inside of pushrod 158, as shown in FIG. 12(c). In this embodiment, the internal seal provided by biased ball 132 helps retain the fuel inside pushrod 158 when valve component 160 is disconnected from valve component 152 as discussed above. Also, as shown, a pump is provided to pump fuel past biased ball 132. Preferably, opening "A" is less than about 10 mm and more preferably less than about 5 mm. Preferably, distance "B" is at least about 2 mm and more preferably at least about 5 mm.

Figure 13:
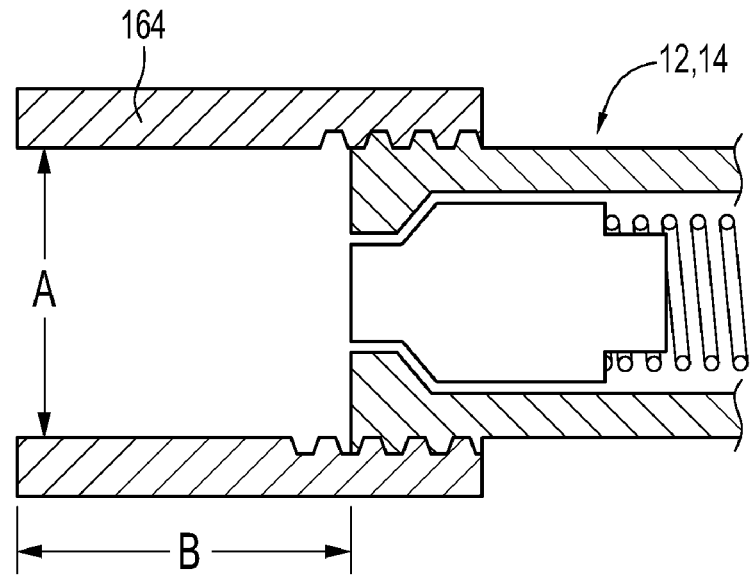
FIG. 13 is a cross-sectional view of another valve component in accordance to the present invention.

Access to the valve component may also be limited by another leading member, outer sleeve 164, covering valve component 12, 14, as shown in FIG. 13. Opening "A" and length "B" of sleeve 164 are dimensioned to render unintentional opening of the internal seal of the valve component more difficult. Sleeve 164 can be made integral to the valve component or can be connected to the valve component by threads (as shown), adhesive, ultrasonic welding, press-fitting or other means. Preferably, opening "A" is less than 10 mm and more preferably less than 5 mm. Preferably, length "B" is at least 2 mm and more preferably at least 5 mm.

Figure 14:
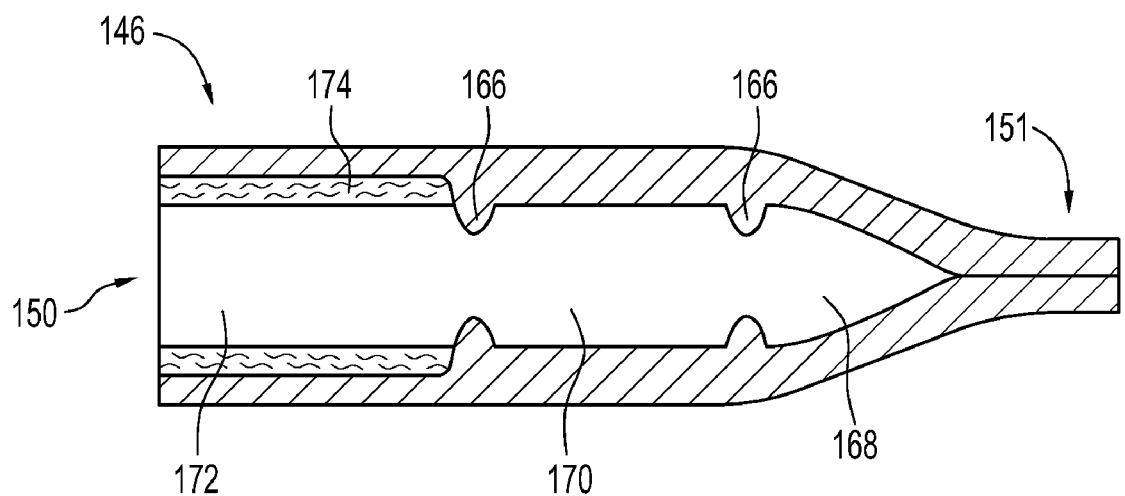
FIG. 14 is a cross-sectional view of another valve component in accordance to the present invention.

In accordance to another aspect of the present invention, duckbill valve 146 may have a plurality of wipers 166, as shown in FIGS. 11(c) and 14. Wipers 166 are adapted to form seal(s) with the outside surface of pushrod 126. As pushrod 126 withdraws from a valve component, e.g., after a cartridge is filled with fuel or when the cartridge is removed from the electronic equipment, pressurized fuel may be present. As the pushrod leaves sealed end 151, pressurized fuel is allowed to expand within first chamber 168. As fuel expands, its pressure drops. Additional expansion chambers, such as second chamber 170, can be provided to drop the pressure of the fluid further. Optionally, duckbill valve 170 is provided with material 174 in chamber 172 to act on any remaining fuel. Material 174 include additives that can mix with the fuel, filler materials or foams that can absorb and hold the fuel, or swellable materials that absorb and swell to close channel 150. Preferred absorbent materials include, but are not limited to, cross-linked polyacrylic acid salts, polyvinyl alcohol, poly(2-hydroxyethyl methacrylate), poly(ethylene oxide), isobutylene-maleic acid copolymers, poly(methacrylic acid) salts, polyacrylaminde, and polyvinylpyrrolidone. These materials are disclosed in the '427 patent application, which has already been incorporated herein by reference.

Figure 15:
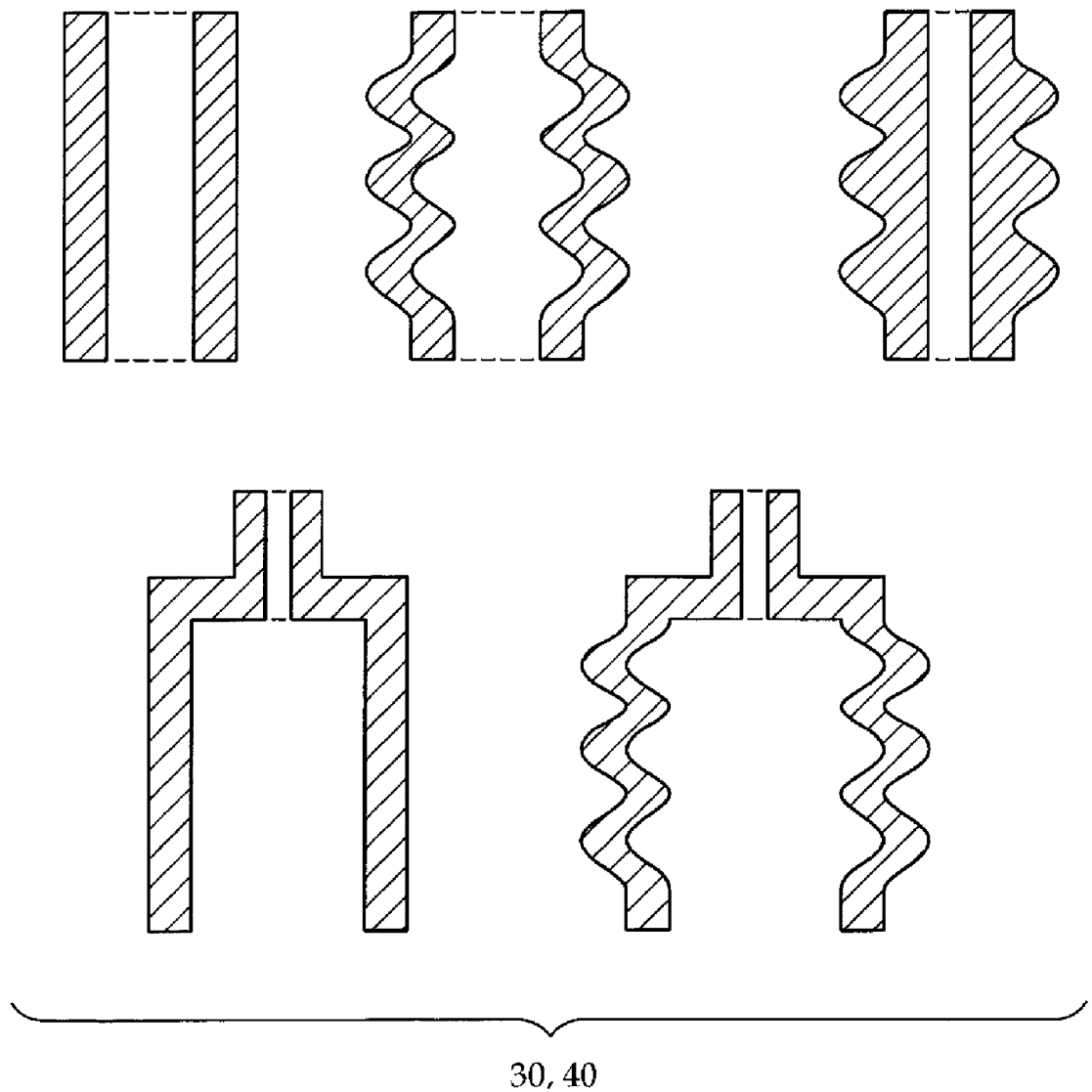
FIG. 15 shows cross-sectional views of alternate rubber springs.

The biasing springs disclosed herein are illustrated as helical or coil springs and rubber springs. However, any type of springs can be used. Suitable springs include, but are not limited to, coil springs, leaf springs, compressed foam springs, and rubber springs, among others. Preferably, the springs are made from materials that are inert to the fuel contained in the cartridge and transported through the valve component to the fuel cell such as Inconel, stainless steel, and rubber. Suitable rubber spring materials include ethylene propylene rubber, ethylene propylene diene methylene terpolymer (EPDM) or Vitron® fluoro-elastomer, Buna N Nitrile, other nitrile rubbers. These materials can be compressed to provide the biasing force. FIG. 15 shows alternative shapes for the rubber spring. Rubber springs may have a hollow cylindrical shape, as discussed above with respect to FIGS. 7(a)-7(c). Alternatively, instead of having substantially straight sidewalls, the rubber spring may have wavy sidewalls to control the compression of the spring. The waves control the buckling or compression of the rubber spring.

For the connecting valves disclosed herein, when the fuel cartridge needs to be changed, the inter-component seal is preferably opened after the internal seals within the valve components are re-established to isolate the residual fuels within the fuel cartridge. Also, the connecting valves illustrated in FIGS. 1-3, 6-7, 9 and 11-14 are usable with pressurized and non-pressurized fuel cartridges.

For use with any of the valves described herein, a pump can be used to transport fuel from the fuel cartridge. Usable pumps can be any pump capable of transporting fluid at the desired rate. Preferably, these pumps are microelectromechanical pumps (MEMS), such as those discussed and claimed in the '793 patent application. The MEMS pump can be either a field-induced pump or a membrane-displacement pump. A field-induced pump has an AC or DC electrical field or magnetic field applied to the fuel/liquid to pump the fuel/liquid. Suitable field-induced pumps include, but are not limited to, electrohydrodynamic pump, magneto hydrodynamic pump and electro-osmotic pump. The electrohydrodynamic pump and an electro-osmotic pump can be used together. A membrane-displacement pump comprises a membrane and a force is applied to the membrane causing the membrane to move or vibrate to pump the fuel. Suitable membrane-displacement pumps include, but are not limited to, electrostatic pump, piezoelectric pump and thermopneumatic pump. The MEMS pump controls the speed of the flow of fuel and reverses the flow, as well as stopping the flow.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:

1. A valve comprising:
   a first valve component connectable to one of either a fuel supply or a fuel cell,
   a second valve component connectable to the other of either a fuel supply or a fuel cell,
   wherein the first valve component comprises a first outer housing and a biased first sleeve and the first sleeve is slidable relative to the outer housing and to a first filler contained within the first sleeve, and wherein the second valve component comprises a second outer housing, a second sleeve and a second filler contained within the second sleeve, and
   wherein during connection the first sleeve and the second sleeve push each other so that the first filler abuts the second filler to form a fluid flow path through the valve, wherein at least one of the first and second filler comprises fuel permeable material to transport fuel by capillary action.

2. The valve of claim 1, wherein the second sleeve is fixed relative to the housing.

3. The valve of claim 1, wherein during connection the first valve component and the second valve component form an inter-component seal.

4. The valve of claim 3, wherein the inter-component seal is formed before the fluid flow path is formed.

5. The valve of claim 1, wherein the first slidable sleeve is biased by a spring.

6. The valve of claim 1, wherein during connection the first sleeve is pushed back to expose at least a portion of the first filler.

7. The valve of claim 6, wherein the second filler is positioned behind the leading edge of the second sleeve to form a cavity in the second sleeve.

8. The valve of claim 7, wherein the exposed portion of the first filler is sized and dimensioned to be received in said cavity.

9. The valve of claim 1, wherein the second filler is positioned behind the leading edge of the second sleeve to form a cavity in the second sleeve.

10. The valve of claim 1, wherein the valve further comprises a retainer to keep the two valve components in the connected position.

11. The valve of claim 10, wherein the retainer is a snap-on retainer.

12. The valve of claim 10, wherein the retainer comprises a spring arm connected to the first valve component, a head disposed at the end of the arm and a receiving cavity defined on the second valve component, said cavity is sized and dimensioned to receive said head.

13. The valve of claim 1, wherein the housing of at least one valve component comprises a leading member sized and dimensioned to limit access to the filler.

14. The valve of claim 13, wherein the leading member comprises an outer sleeve.

15. The valve of claim 1, wherein at least one valve component is initially covered by a covering member and the covering member is removed before the valve components are connected to each other.

16. The valve of claim 15, wherein the covering member comprises a cap.

17. The valve of claim 15, wherein the covering member comprises a film.

18. The valve of claim 1, wherein the fuel supply comprises a fuel cartridge, a fuel container or a fuel line.

19. The valve of claim 1, wherein both the first and second filler comprise fuel permeable material to transport fuel by capillary action.

20. A valve comprising:
    a first valve component connectable to one of either a fuel supply or a fuel cell,
    a second valve component connectable to the other of either a fuel supply or a fuel cell,
    wherein the first valve component comprises a first outer housing and a biased first sleeve and the first sleeve is slidable relative to the outer housing and to a first filler contained within the first sleeve, and wherein the second valve component comprises a second outer housing, a second sleeve and a second filler contained within the second sleeve, and
    wherein during connection the first sleeve and the second sleeve push each other so that the first filler abuts the second filler to form a fluid flow path through the valve, wherein the valve further comprises a liquid retention material positioned spaced apart from the fluid flow path.

21. The valve of claim 20, wherein the liquid retention material comprises hydrophilic material.

22. The valve of claim 20, wherein the liquid retention material comprises liquid swellable material.

23. The valve of claim 20, wherein the liquid retention material comprises additive.

24. The valve of claim 23, wherein the additive mixes with the fuel.

25. The valve of claim 20, wherein the liquid retention material is disposed in an annular area between the outer housing and the sleeve in at least one of the valve components.

26. A valve comprising:
 a first valve component connectable to one of either a fuel supply or a fuel cell,
 a second valve component connectable to the other of either a fuel supply or a fuel cell,
 wherein the first valve component connects to the second valve component to form a fluid flow path through the valve, and
 wherein the valve further comprises a retention material capable of absorbing liquid remaining in the valve when the first valve component disconnects from the second valve component.

27. The valve of claim 26, wherein the retention material comprises a swellable material.

28. A valve comprising:
 a first valve component connectable to one of either a fuel supply or a fuel cell,
 a second valve component connectable to the other of either a fuel supply or a fuel cell,
 wherein the first valve component connects to the second valve component to form a fluid flow path through the valve and at least one of the valve components comprises an internal seal and a fluid retention material capable of retaining liquid.

29. The valve of claim 28, wherein the retention material is located in front of the internal seal.

30. The valve of claim 28, wherein the retention material is located in behind the internal seal.

31. The valve of claim 28, wherein the retention material comprises a swellable material.

* * * * *